July 5, 1949.  M. PETTI  2,475,251
SAFETY PIN

Filed March 15, 1947  2 Sheets-Sheet 1

INVENTOR.
MARIE PETTI
BY
ATTORNEY

July 5, 1949. M. PETTI 2,475,251
SAFETY PIN

Filed March 15, 1947 2 Sheets-Sheet 2

INVENTOR.
MARIE PETTI
BY
ATTORNEY

Patented July 5, 1949

2,475,251

UNITED STATES PATENT OFFICE 2,475,251

SAFETY PIN

Marie Petti, New York, N. Y.

Application March 15, 1947, Serial No. 734,941

1 Claim. (Cl. 24—156)

The present invention relates to fastening means and, more particularly, to novel fastening means in the form of a pin which is generally of circular shape. The pin of this invention is provided with a novel guard which prevents accidental opening of the pin, rendering it safe and secure in use.

An object of the invention is to provide a fastening means in the form of a circular pin having a novel guard.

Another object is to provide a circular safety pin having a novel guard for the point.

A further object is to provide a novel safety pin having a circular tapering shank.

Still another object is to provide a safety pin, the guard of which is of ornamental shape.

A still further object of the invention is to provide a safety pin having a hinged guard.

Other, and, perhaps, more specific objects of the invention, will become apparent from a reading of the following specification in connection with the accompanying drawings in which.

Figure 1:
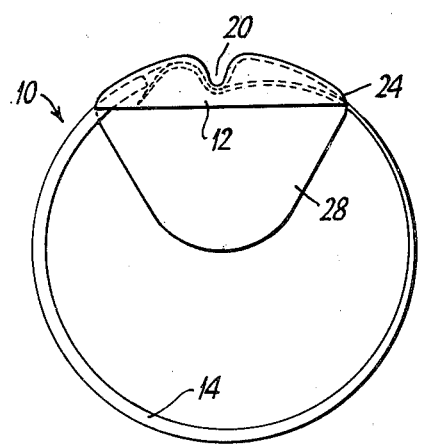
Fig. 1 is a view in elevation of a pin embodying the invention in one form.

Referring for the present to Fig. 1 of the drawings, there is shown a pin 10 embodying the invention in one form. The pin comprises a guard 12, generally of tubular form, and a pin or shank 14 having a piercing point 16. The shank 14 tapers for approximately half its length to the point 16, but it may have a uniform taper, if desired. The thicker part produces firmer spring quality. The shank may be made of a suitable material, such as stainless steel.

Figure 2:
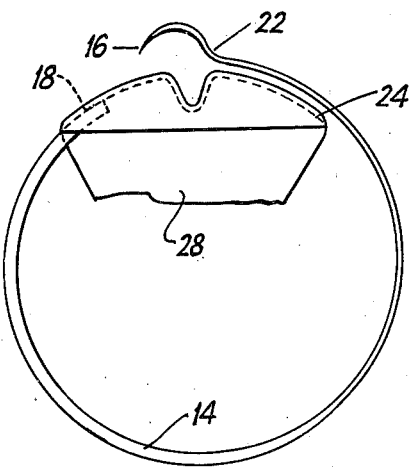
Fig. 2 is a view of the pin of Fig. 1 in open position.

The guard 12 has a generally tubular portion, which receives the end 18 of the shank 14. Solder may be used to secure the end 18 in the opening in one end of the guard 12. The side of the wall of the guard 12 is indented as indicated at 20 to project into a bend 22 near the point 16 of the pin 14 when the pin is inserted in the socket end 24 of the guard as shown by Fig. 1. Preferably, the springy quality of the shank facilitates insertion of the point in the guard in firm locking. This is the closed position of the pin 10 and as shown in Fig. 2, the shank 14 springs outwardly when the point 16 is withdrawn from the open socket end 24 of the guard 12. Fig. 2, therefore, shows the open position of the pin 10 when it is ready for use. Again, the springy quality of the shank facilitates removal of the point from the guard. While as stated and as shown in the drawing, the portion of the guard which receives the shank is generally tubular, it may, within the scope of the invention, have other forms which can readily be indented. A tubular shape formed from a piece of tubing is also contemplated.

In accordance with the invention, the guard 12 may be shaped to give it an ornamental form. For example, as shown in Figs. 1 and 2, it may have a piece or plate 28 secured to it which may be initialed or ornamented in a desired manner, as by engraving. It is, of course, within the scope of the invention to form the guard 12 with the plate 28 integrally. The piece or plate 28 has the function of holding the pinned material flat within the loop of the shank 14. For many uses of the pin of this invention, the plate 28 may be omitted. Any known forming operation may be resorted to for the purpose of forming the socket opening both for the end 18 and the point 16 of the shank 14. The indentation 20 may be formed later or at the same time. In Figs. 1 and 2, the plate 28 together with the guard 12 and its indentation 20 presents a heart shape. Other forms may be given to the guard 12 and the plate 28, or either.

From the foregoing description, it is believed that the manner of using the pin 10 will be understood. With the point released, as shown in Fig. 2, it may be inserted in the part or parts to be fastened. Also, several of the pins 10 may be used as links in a chain (not shown). When the point 10 is inserted in material to be fastened, layers of cloth, for example, and re-inserted from the other side in the usual manner, the point 16 is introduced into the open socket end 24 and pressed inwardly, or it is allowed to spring inwardly until the bend 22 engages the indentation 20. The shank 14 is then securely locked in the guard 12 by the outward peripheral bias of the spring shank 14.

A number of uses of the pin 10 and its modifications will be mentioned by way of example, it being understood that many other uses are possible: To hold buttons without sewing; to hold shoulder pads without sewing; to hold dress shields without sewing; to hold pocket handkerchiefs; to hold corsages; to hold the stem or stems of a flower or flowers; to hold shoulder straps together; to shorten bra and slip straps; as a pin-on key ring; for curtains, drapes and the like; chatelaine pins; costume jewelry; to obtain proper draping on dresses; an ornamental holder; and many other uses, as mentioned above.

Figure 3:
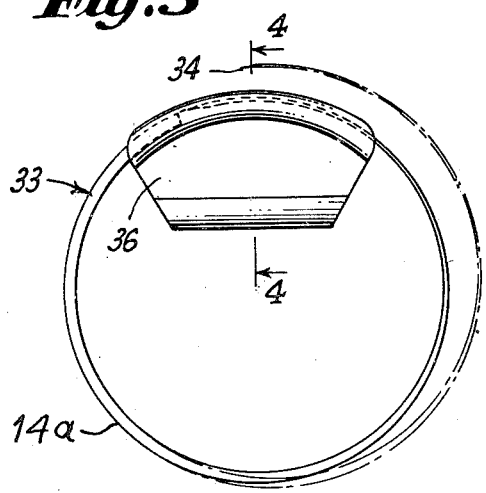
Fig. 3 is a view in elevation of a modified pin of the invention.
Figure 4:
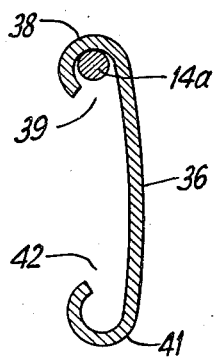
Fig. 4 is a fragmentary view in section on line 4—4 of Fig. 3.
Figure 5:
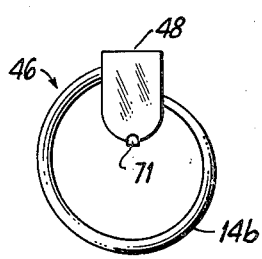
Fig. 5 is a view in elevation of another modification of a pin of this invention.
Figure 6:
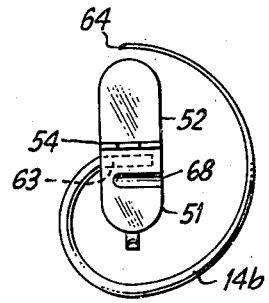
Fig. 6 is a view showing the pin of Fig. 5 in open position.
Figure 7:
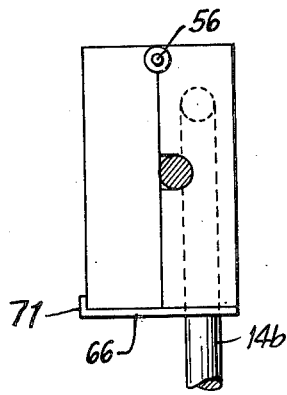
Fig. 7 is a view in side elevation of the pin of Fig. 5.
Figure 8:
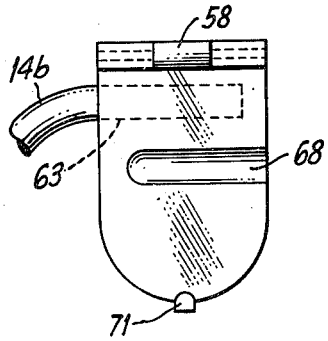
Figs. 8 and 9 are detail views.
Figure 9:
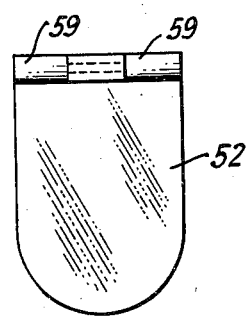

Figs. 3 and 4 of the drawings show a modification of the pin 10 of Figs. 1 and 2. The pin of this modification is designated in its entirety, by reference character 33. The pin or shank 14a is similar to, or may be identical with, the shank 14 of Figs. 1 and 2 of the drawings. It may be uniformly tapered as shown and ends in a piercing point 34. It is preferably of springy material having a substantially permanent set to the dot-dash illustrated position.

The guard 36 is or may be of sheet metal formed generally as shown by Fig. 4. It is bent into a roll 38, but leaving a gap 39 to accommodate the end of the shank 14a when the pin 33 is opened and closed. A second roll 41 limits radial or inward movement of the end of the shank 14a when the pin 33 is opened and closed. A larger gap 42 is provided to permit free movement of the end, of the shank 14a since no locking function, but only a guarding function, is involved.

When the point 34 is to be released from the guard 36, the tapered end of the shank 14a is pressed radially inwardly through the gap 39, whereupon it is removed substantially axially of the circular shank 14a. The roll 41 prevents too great an inward movement of the end of the shank, which in some instances may damage the fastened material.

As pointed out above, the modification of Figs. 3 and 4 is capable of the same uses as the pin 10 of Figs. 1 and 2. Also, an ornamental part (not shown) may be added, or one side of that guard 36 may be ornamental, if desired.

Figs. 5 to 9 of the drawings show a further modification of the pin of this invention. The modified pin 46 comprises a guard 48 and a pin or shank 14b.

The guard 48 is made in two parts 51 and 52 which are joined by a hinge 54. This hinge may be of any suitable type, but is preferably of the lighter and more compact form employed in lockets and other small jewelry. In the illustrative embodiment, the hinge comprises a pin 56 which passes through an opening in the tongue 58 and the tongues 59. Each tongue is accommodated by a recess in the opposed part.

The parts 51 and 52 of the guard 48 are shown, by way of example, as solid pieces, but it will be understood that they may be of sheet metal or any suitable material. For example these parts may be made of an ornamental metal such as gold or silver, or of plastic. Desired ornamentation may be provided.

The part 51, as shown illustratively, is socketed or recessed at 63 to receive the fixed end of the pin 14b. The pin is generally circular, tapered and ends in sharp point 64. A detent or latching means, such as the clasp or catch 66 detachably secures the parts 51 and 52 in facing engagement to hold the pointed end 64 of the shank 14b in a recess 68 formed in the part 51 when the pin is closed. It will be understood that the pointed end 64 of the shank 14b received in recesses (not shown) which are pressed into or otherwise formed in both parts 51 and 52. Also the part 51 may have the shank 14b soldered or welded to it thus eliminating the need for the socket 63.

The clasp or catch 66 may be of any desired kind, such as the illustrated strip provided with a hook 71, or it may be of the kind used on lockets or other light jewelry.

Figure 10:
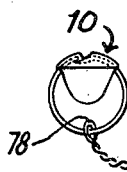
Fig. 10 illustrates one use of the pin of this invention.

Fig. 10 of the drawings illustrates a use of any one of the pins of the invention, the pin 10 of Fig. 1, for example. A chain 75 of any desired or convenient length is provided with an eye or ring 78 at one end, which receives the shank 14 of the pin. The other end of the chain 75 is secured to an article holder 81. In the illustrated arrangement, the article holder 81 is in the form of a cap or the like having a recess for receiving a pencil 82, for example. The pin 10 is to be attached to a garment of the wearer, and the pencil 82 is kept conveniently accessible.

The invention claimed and sought to be secured by Letters Patent is:

A safety pin comprising a guard and a shank, said shank being substantially circular and tapering adjacent one end to a point, said guard comprising a substantially flat section, a roll in said guard, said roll being substantially of arcuate shape throughout its axial length, said shank projecting into and being anchored by said roll at the end opposite said point, the remainder of said guard providing a radially inwardly directed opening to receive the pointed end of said shank in the closed condition of the pin, a second roll in said guard disposed radially inwardly of the circular configuration of said shank and spaced from said first roll to provide said substantially flat section, said second roll having a radially outwardly directed opening to limit radial inward movement of the pointed end of said shank.

MARIE PETTI.

REFERENCES CITED

The following references are of record in the file of this patent:

UNITED STATES PATENTS

| Number | Name | Date |
| --- | --- | --- |
| 329,122 | Bauer | Oct. 27, 1885 |
| 785,857 | Cassity | Mar. 28, 1905 |
| 897,136 | Pearl | Aug. 25, 1908 |
| 1,011,937 | Francis | Dec. 19, 1911 |
| 2,275,984 | Nitchman | Mar. 10, 1942 |

FOREIGN PATENTS

| Number | Country | Date |
| --- | --- | --- |
| 1,144 | Great Britain | 1879 |
| 189,937 | Great Britain | Dec. 14, 1922 |
| 219,508 | Great Britain | July 31, 1924 |